(12) United States Patent
Goldenstein et al.

(10) Patent No.: US 11,102,623 B2
(45) Date of Patent: Aug. 24, 2021

(54) METHOD FOR ACTIVATING USERS, METHOD FOR AUTHENTICATING USERS, METHOD FOR CONTROLLING USER TRAFFIC, METHOD FOR CONTROLLING USER ACCESS ON A 3G-TRAFFIC REROUTING WI-FI NETWORK AND SYSTEM FOR REROUTING 3G TRAFFIC

(71) Applicant: MLS Wireless S/A, Rio de Janeiro (BR)

(72) Inventors: Mauro Goldenstein, Rio de Janeiro (BR); Rogerio Passy, Rio de Janeiro (BR); Luiz Victor Passy, Rio de Janeiro (BR); Igor Marques Carneiro da Silva, Rio de Janeiro (BR)

(73) Assignee: MLS Wireless S/A, Rio de Janeiro (BR)

( * ) Notice: Subject to any disclaimer, the term of this patent is extended or adjusted under 35 U.S.C. 154(b) by 98 days.

(21) Appl. No.: 14/377,083

(22) PCT Filed: Feb. 4, 2013

(86) PCT No.: PCT/BR2013/000035
§ 371 (c)(1),
(2) Date: Aug. 6, 2014

(87) PCT Pub. No.: WO2013/116913
PCT Pub. Date: Aug. 15, 2013

(65) Prior Publication Data
US 2021/0235235 A1 Jul. 29, 2021

(30) Foreign Application Priority Data
Feb. 10, 2012 (BR) .................... BR102012003114-0

(51) Int. Cl.
*H04W 4/14* (2009.01)
*H04W 84/12* (2009.01)
(Continued)

(52) U.S. Cl.
CPC ............... *H04W 4/14* (2013.01); *H04W 8/26* (2013.01); *H04W 12/04* (2013.01); *H04W 12/06* (2013.01); *H04W 12/10* (2013.01); *H04W 84/12* (2013.01)

(58) Field of Classification Search
CPC ...................................................... H04W 4/14
See application file for complete search history.

(56) References Cited

U.S. PATENT DOCUMENTS 6,460,138 B1 * 10/2002 Morris ................. G06Q 20/341
713/168
7,150,038 B1 * 12/2006 Samar ..................... G06F 21/41
726/8

(Continued)

FOREIGN PATENT DOCUMENTS

EP         1924048 A1    5/2008
WO   WO 2005/008964 A1   1/2005

(Continued)

OTHER PUBLICATIONS

International Searching Authority, International Search Report (ISR) and Written Opinion for International Application No. PCT/BR2013/000035, dated May 22, 2013, 10 pages, National Institute of Industrial Property, Brazil.

(Continued)

*Primary Examiner* — Esther B. Henderson
(74) *Attorney, Agent, or Firm* — Alston & Bird LLP

(57) ABSTRACT

The present invention relates to a system for rerouting independent traffic on the networks of the mobile telephony operators, such as the GSM network, as well as the use of (Continued)

methods for user authentication and activation, traffic control and user access on a 3G-traffic rerouting Wi-Fi network. The rerouting Wi-Fi network proposed is independent of the mobile telephony network operators and enables the data traffic rerouting service to be provided to users of several operators simultaneously. The system includes its own database containing user information, obviating the need to consult operator databases. The system proposed also enables a user of operator A to purchase a Wi-Fi data plan from operator B using the International Mobile Subscriber Identity (IMSI) authentication of operator A, thereby obviating the need to replace the SIM card. Access to roaming users, i.e. users outside their native numbering area, is also permitted.

5 Claims, 6 Drawing Sheets

(51) Int. Cl.
*H04W 8/26* (2009.01)
*H04W 12/06* (2021.01)
*H04W 12/10* (2021.01)
*H04W 12/04* (2021.01)

(56) References Cited

U.S. PATENT DOCUMENTS

| | | |
|---|---|---|
| 2004/0235455 A1 | 11/2004 | Jiang |
| 2005/0114339 A1* | 5/2005 | Challener ............ G06F 16/252 |
| 2006/0236105 A1 | 10/2006 | Brok et al. |
| 2007/0268855 A1 | 11/2007 | Grayson et al. |
| 2007/0268888 A1* | 11/2007 | Shatzkamer ............ H04L 63/08 |
| | | 370/352 |
| 2009/0149175 A1* | 6/2009 | Lopresti ............ H04W 8/265 |
| | | 455/433 |
| 2009/0204815 A1 | 8/2009 | Dennis et al. |
| 2009/0328144 A1* | 12/2009 | Sherlock ............ G06F 21/10 |
| | | 726/2 |
| 2010/0135491 A1 | 6/2010 | Bhuyan |
| 2010/0154044 A1 | 6/2010 | Manku |
| 2011/0222523 A1 | 9/2011 | Fu et al. |
| 2013/0080779 A1* | 3/2013 | Holtmanns ......... H04L 63/0414 |
| | | 713/168 |

FOREIGN PATENT DOCUMENTS

| | | |
|---|---|---|
| WO | WO 2006/052563 A2 | 5/2006 |
| WO | WO 2006/055986 A2 | 5/2006 |
| WO | WO 2011/110108 A1 | 9/2011 |

OTHER PUBLICATIONS

International Preliminary Examining Authority, International Preliminary Report on Patentability, including Applicant's Dec. 9, 2013 Response to ISA's May 22, 2013 Written Opinion, for International Application No. PCT/BR2013/000035, dated Jun. 5, 2014, 10 pages, National Institute of Industrial Property, Brazil.
International Searching Authority, English Translation of Written Opinion for International Application No. PCT/BR2013/000035, dated May 22, 2013, 8 pages, National Institute of Industrial Property, Brazil.
International Preliminary Examining Authority, English Translation of International Preliminary Report on Patentability, including English Translation of Applicant's Dec. 9, 2013 Response to ISA's May 22, 2013 Written Opinion, for International Application No. PCT/BR2013/000035, dated Jun. 5, 2014, 13 pages, National Institute of Industrial Property, Brazil.

* cited by examiner

METHOD FOR ACTIVATING USERS, METHOD FOR AUTHENTICATING USERS, METHOD FOR CONTROLLING USER TRAFFIC, METHOD FOR CONTROLLING USER ACCESS ON A 3G-TRAFFIC REROUTING WI-FI NETWORK AND SYSTEM FOR REROUTING 3G TRAFFIC

CROSS REFERENCE TO RELATED APPLICATIONS

This application is a National Stage Application, filed under 35 U.S.C. § 371, of International Application No. PCT/BR2013/000035, filed Feb. 4, 2013, which claims priority to and the benefit of Brazilian Application No. BR102012003114-0, filed Feb. 10, 2012; the contents of both of which are hereby incorporated by reference in their entirety.

BACKGROUND

Related Field

The present invention relates to an independent and multi-operator 3G traffic deviation system, to methods of activating, authenticating and controlling user access in the system, and to a method of controlling traffic in the system.

One proposes the implementation of a Wi-Fi network independent of the mobile telephony network operators, which can provide the service of deviating data traffic to users of various operators simultaneously. The system has a database of its own, in which the information on the users is kept, so that there should not be a need to make consultations with databases of the operators, thus making the system independent.

Moreover, the system enables the user of operator A to buy a Wi-Fi data plan of operator B by using the IMSI (International Mobile Subscriber Identity) authentication of operation A, thus eliminating the need to replace the SIMCARD. The system further enables users to access in roaming, that is, out of the native area of their numbering.

Description of Related Art

Mobile access to the Internet has been increasing considerably with every passing year on a world-wide scale. In some countries, the number of mobile access already exceeds widely the number of fixed accesses to the Internet. In the last 3 years, the growth of the number of mobile access in some countries is exceeds 100% a year. This popularization of the mobile access has taken place chiefly with the implantation of the 3G-cellular networks, combined with the development and growing supply of smartphones and tablets, bringing about more accessible prices.

The effects of this accelerated growth can already be observed in larger urban centers, where both the 3G technology and the infrastructure of installed network are no longer bearing the demand for new users. On the cellular networks, due to a number of factors, the increase in the number of cells is not always possible and/or feasible. The limitation of the use of the frequency spectrum by the operators is one of the limiting factors for the supply of more and better data services to the users. Additionally, the next technological generation of the cellular mobile networks, namely 4G, has not been implemented yet, and the frequencies and divisions of these networks have not been defined.

The use of the Wi-Fi technology arises as the main solution, feasible in the short term, to the problem of congestion of the present-day mobile telephony. Various aspects contribute to this technological option, such as: the existence of Wi-Fi interface on most smartphones and tablets; the worldwide standardization of the Wi-Fi technology; the existence of hundreds of equipment makers; the reduced cost for implementation of hotspots; the compaction of AP (Access Points) pieces of equipment; the high transmission rate that the technology enables; and the total integration with IP (internet Protocol) systems.

Wi-Fi networks, also known as WLAN (Wireless Local Area Network), use the standards of the 802.11 family (for example: 802.11a, 802.11b, 802.11g and 802.n), defined by the IEEE (Institute of Electrical and Electronics Engineers). Originally, however, there are telephones with all four protocols 802.11a/b/g/n operating on 2.4 HGz, 5.3 GHz and 5.8 GHz. Exemplifying with regard to the high transmission rate values that the Wi-Fi technology enables, the protocols 802.11a and 802.11n have transmission capacity of over 100 Mb/s.

For the reasons set forth above, the use of the Wi-Fi technology for relieving the mobile networks has been the study subject of a number of papers. Document WO 2005/008964 A1 and document US 2007/0268855 A1, for instance, present the WLAN networks integrated to the GMS 3G system. This integration between the networks is made in a complex manner and need a direct integration between the WLAN and GSM networks for user identification and authentication, since there is no independent mechanism for authenticating the user outside the GSM network.

An integration through the simultaneous operation of the Wi-Fi and 3G networks by means of proxy servers located within the operator is disclosed in document US 2010/01154044 A1. However, some limitations are presented for large operations, the traffic of which may reach dozens of Gigabits per second (Gb/s). These integrations with the operation systems has the objective of reusing the access and authentication control systems through the HLR (Home Locator Register), since only these systems have the authentication key Ki related to the IMSI (International Mobile Subscriber Identity) recorded on the SIMCARD of each apparatus. This integration mode limits the relief system to only one operator. Such a limitation also takes place in document US 2011/0222523, US 2007/0268855 A1 and in document WO 2006/055986 A2.

The present invention describes a system in which the access to the HLR is not necessary. The system has a key of its own, created and transmitted in security to each UME (user mobile equipment), without the need to make use of the Ki key as in the systems of the above-mentioned documents. In other words, the proposed system provides process for authenticating users that is totally out of the controls and systems of the 3G network, without consultation with the databases of the operator. Besides, the proposed system makes the confirmation of the authentication key, sent back via SMS by the W-Fi network, which represents a security system against any type of tampering, since it is not possible for a false user to receive information on the key via SMS. As a comparison, document US 2011/0222523 A1 proposes a paging system only to inform the existence of an access point and to initiate migration to the Wi-Fi network, without any security mechanism.

Document US 2010/0135491 A1 presents an identification method through identification of user and password input by hand by the user at the moment of access to the Wi-Fi network. In the system proposed by the present invention, there is no interference of the user with the authentication process, providing a great increase in security of the access control. The whole authentication process is based on the IMSI and MSISDN (Mobile Subscriber Integrated Services Digital Network Number) numbers, which are captured by the user mobile equipment (UME). The MSISDN number is, in reality, the user's cellular number. It should be noted that, although the MSISDN is not usually recorded on the SIMCARD, the proposed system presents a method for identification thereof in a safe way and the due association with the respective IMSI. Thus, the proposed system automatically builds its own database for controlling and authenticating users by exchange of transmitted keys, in a safe and transparent manner to the user, via SMS (Short Message Service). If necessary, this process of authentication via SMS can be effected a number of times for revalidating the user's authenticity. Since there is no direct interaction with the system of the operator, the proposed system identifies the user's operator through the MCC (Mobile country Code) and the MNC (Mobile Network Code), thus enabling access by the user of different operators. This statistic is of great importance and provides the proposed system with an enormous difference with respect to the traffic deviation systems existing in the prior art.

Control over the traffic deviation process is an important factor for optimizing the total of traffic deviated. The method presented in document US 2011/0222523, for instance, needs the coexistence of the 3G and Wi-Fi networks, since the control, decision and information on traffic deviation to the Wi-Fi network are transmitted through the 3G network. The same thing occurs in document US 2004/0235455 A1. Such transmissions may undergo delays due to the jamming of the 3G network, thus preventing rapid access to the deviation network. In the present invention, the deviation decision process is controlled by the UME, thus preventing the increase in control traffic on the 3G network in a determined area, and raising the velocity and efficiency in accessing the Wi-Fi network.

BRIEF SUMMARY

The present invention relates to methods for activating, authenticating, controlling traffic and controlling user's access on a Wi-Fi 3G traffic deviation network. The activation method requires the installation of a control program on the user's equipment (UME) and consists of stages of exchange of information (such as IMSI, MSISDN and UPK) between the user's equipment (UME), the authentication server and the database of the system itself. At the end, the UME receives a reply on the activation state.

The user authentication method starts with a request for access to the Wi-Fi deviation network, from the UME to the DHCP sever, which sends an IP number. Then, the UME sends to the authentication server, A TCP packet containing the IMSI number, the MAC address and the IP number. The authentication server checks whether the UME has been previously authenticated, verifies if the formatting of the IMSI number is valid, identifies the user's operator and stores the UME identification data, as well as the public and private keys for evaluation at the database. After verifying the validity of the latest UME authentication at the database, the authentication server sends a RAND random access code via SMS to the UME, which intercepts the message so that the massage will not appear to the user. The RAND code is encrypted through the UPK and sent back to the authentication server together with the ISMI number via Wi-Fi network. Once the UME has been validated, the authentication server stores the IMSI on the database or updates the authentication validity period of the UME. Then, a message of release of access to the deviation network is sent to the traffic control server and an authentication confirmation message is sent to the UME.

The dynamic traffic control method, with traffic control rules being updated with every UME registration on the deviation Wi-Fi, comprises the steps of releasing access to a user, controlling the traffic, controlling jams, blocking UDP/TCP ports, controlling the of simultaneous access, and providing firewall.

With the user access control method, one verifies whether the Wi-Fi receiver of the UME is on and whether there is any Wi-Fi network connected thereto. Then, one seeks a Wi-Fi access point with the SSID of the deviation network of the operator, if the UME is not connected to any Wi-Fi network or when the UME is connected to a different Wi-Fi network of the deviation network of the operator, and the access point found is connected to the UME. Or else one seeks another Wi-Fi access point with the SSID of the deviation network of the operator, if the UME is already connected to the deviation network of the operator, and one compares the signal level of the Wi-Fi access point found of the deviation network with the signal level of the network connected to the UME, opting for the connection with the Wi-Fi access point of better signal level. After this, one verifies the existence of data connection at the Wi-Fi interface connected and makes the authentication of the UME. Finally, the "on" or "off" message is displayed on the UME.

Also, a 3G traffic deviation system is proposed, which comprises at least one piece of equipment of the user, at least one Wi-F access point, connected by at least one VLAN commuter, a DHCP server, a traffic control server, a router, an authentication server, an event recording database and a database of itself.

BRIEF DESCRIPTION OF THE FIGURES

Hereinafter, a brief description of the figures is given.

DETAILED DESCRIPTION OF VARIOUS EMBODIMENTS

Figure 1:
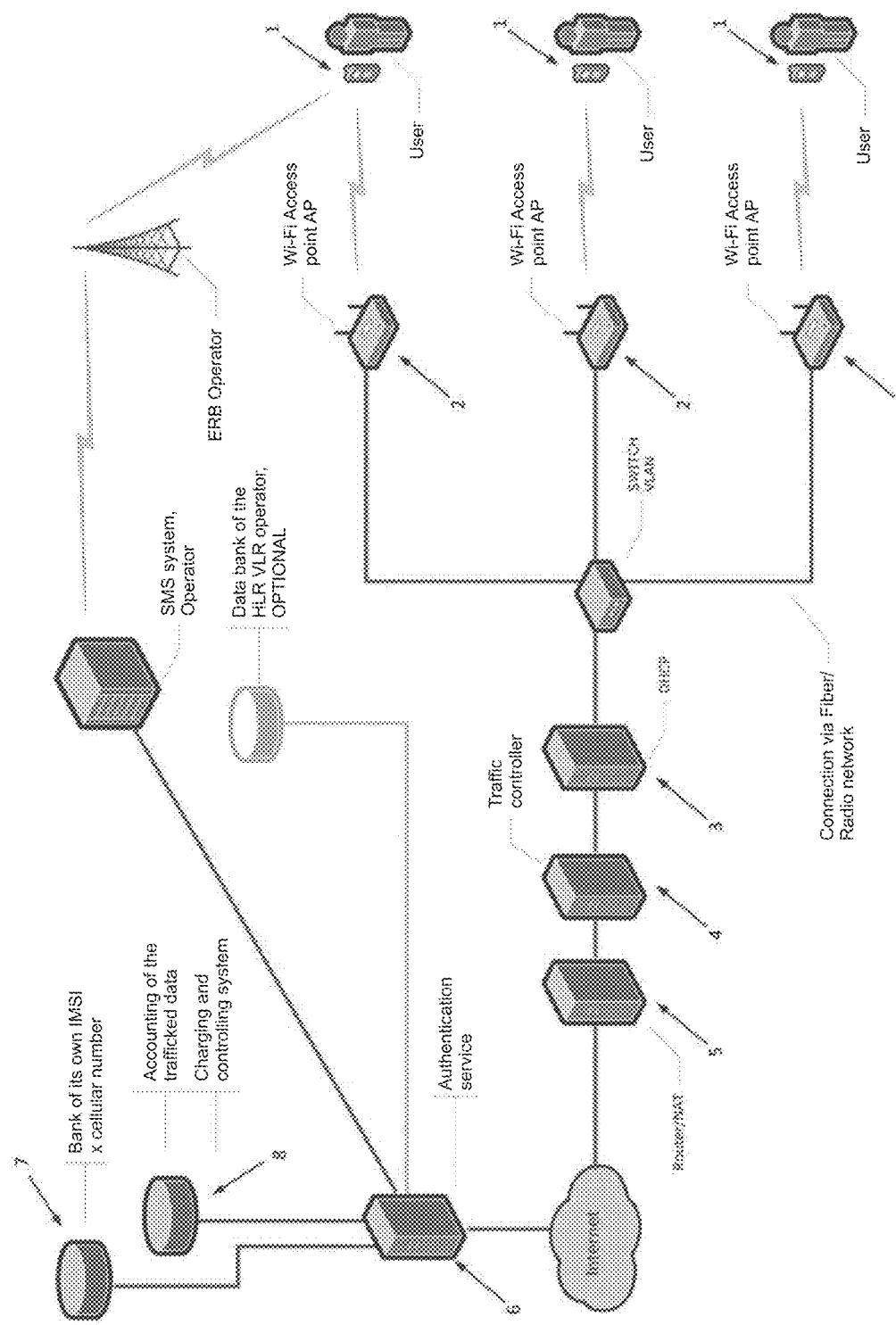
FIG. 1 is an embodiment of the Wi-Fi 3g traffic deviation system.

The present invention is describes hereinafter on the basis of an example of embodiment represented in the drawings.

One proposes the implementation of a traffic deviation system that is independent from the networks of the mobile telephony operators, like the GMS network, as well as the use of methods for activation and user authentication, as well as for controlling traffic and access of user on a Wi-Fi 3G traffic deviation network. Thus, one proposes a solution for the problems present in the prior art, as described before.

From FIG. 1, one can observe the embodiment of the proposed 3G traffic deviation system. The system is composed by the following components: equipment for mobile access of the user (UME) 1; point of access to wireless networks (AP) 2; DHCP (Dynamic Host Configuration Protocol) server 3; traffic control server 4; router 5; user authentication server 6; user database 7; and event recording database (LOG) 8. Then one finds the description of each of these components, with their main characteristics, as well as the interaction relationships between them.

The user equipment (UME) 1 may be a cellular apparatus, a tablet, or any the apparatus the enables mobile access, and should be compatible with protocols 802.11a, 802.11b, 80211g or 802.11n. Only in this way can the user have access to the proposed traffic deviation network, since the latter uses the Wi-Fi technology. In this equipment 1, a wireless access control program is installed in a transparent manner to the user, to effect authentication and release of access to the network.

The access point (AP/PA) 2, that is, a base-radio piece of equipment that enables access to the wireless Wi-Fi network, should be compatible with protocols 802.11a, 802.11b, 80211g or 802.11n and operate on the frequencies authorized by the controlling agencies of each region (country). The PA/AP 2 should have the capability of operating at the "transparent point" mode, so that the IP distribution process, as well as the control of band and user authentication will be carried out between the user equipment 1 and the pieces of equipment responsible for such tasks (server, DHCP 3, traffic control server 4 and user authentication server 6, respectively).

The DHCP 3 server controls the distribution of the IP numbers to each user. The IP numbers are released by the operator in accordance with a list supplied according o the availability of IP's at the system location. The whole IP distribution process follows the DHCP protocol.

The traffic control server 4 exerts both transmission rate control and release of access to the Wi-Fi network. The total release of the user to the Wi-Fi network comprises first step of registering the IP number and the MAC (Media Access Control) MAC on a firewall, so as to release unrestricted traffic between the user equipment 1 and the Internet. Then, in a second step, a HTB (Hierarchical Token Bucket) filter is used to limit the maximum rate to be released to the user. Finally, in a third step, one uses the SFQ (Stochastic Fairness Queuing) process, so as to prevent congestion on the network.

The router 5 of the system defines the internal and traffic output routes of the user. Depending on the availability of the IP numbers of the operator, the router may operate on NAT (Network Address Translation) mode for the distribution of invalid IP's.

The user authentication server 6 controls the release of traffic to the user according to the rules predefined by the operator. Such server 6 receives the information set by the user equipment 1 and then, in possession of this information (IMSI, MAC address and IP supplied by the DHCP server), consults with the user database 7 for validating the authentication of the user identification information.

The user database 7 should contain technical and commercial information on the users, so that the user authentication server 6 can decide whether to relive or not the traffic to the external network (Internet), defining the access velocity and the total of band available for use by the user.

The event recording database 8 records all the operations of releasing, terminating and blocking access to the system. It also processes a database containing the access attempts made by users that are not apt to use the external network. This database is an important commercial tool for selling data plans.

Figure 2:
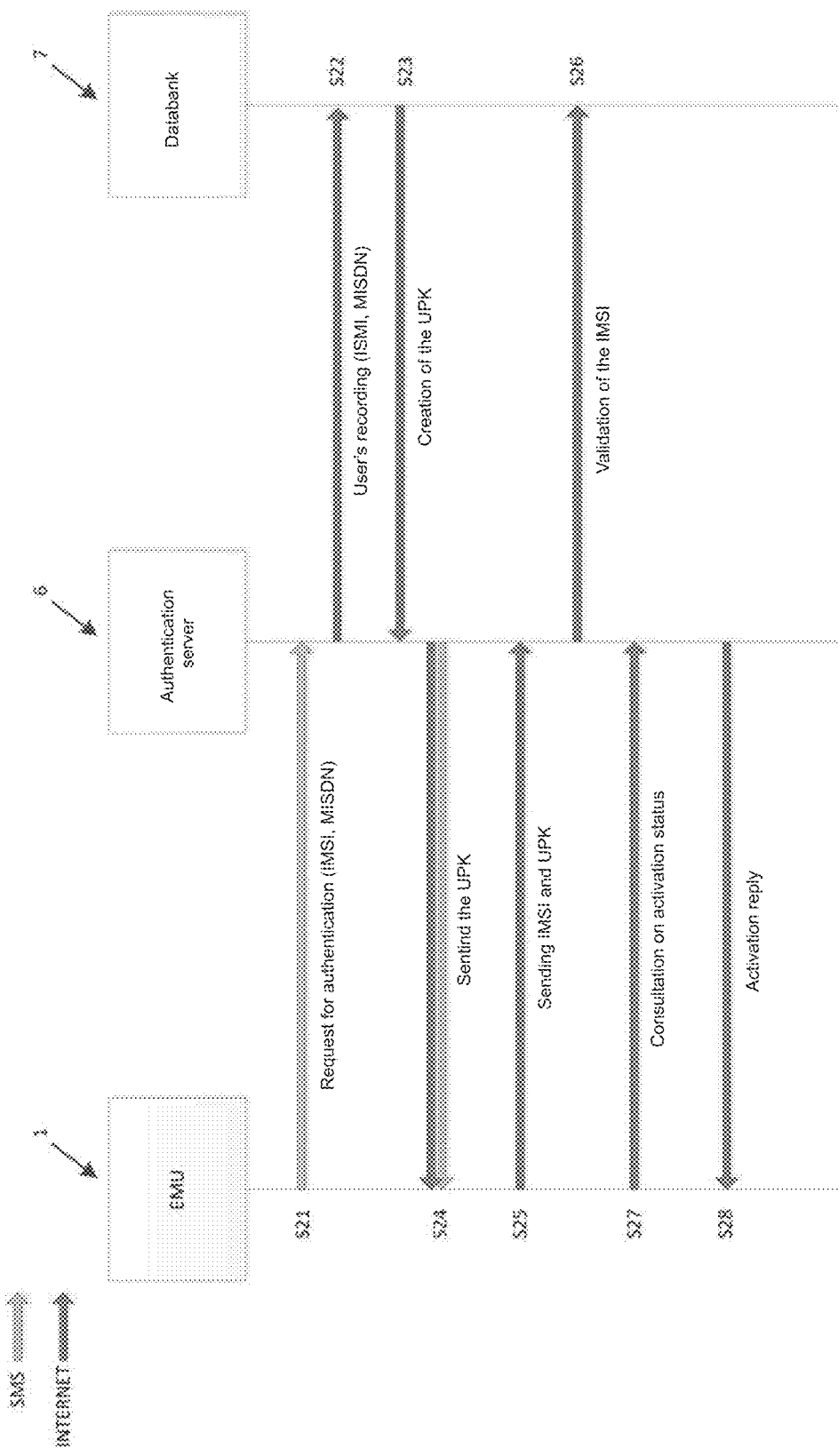
FIG. 2 shows a flow of messages between the components involved in the user activation process in the system.

FIG. 2 shows the process of activating the user in the system. One observes the flow of messages between the components involved in the process. In order for this process to take place, a control program should be installed on the UME 1. The program may either come previously installed by the operator on the UME 1 or be installed by the user himself, who downloads it from the Internet. Once the program has been installed, the process of activating the user in the proposed traffic deviation system is initiated. The first step for this activation is sending S21 from the UME 1 to the authentication server 6, of the IMSI and MSISDN numbers through the SMS message. After the authentication server 6 has received the SMS message, the MSISDN cellular number is captured and associated to the IMSI. The IMSI/MSISDNA pair is then recorded S22 in the user database 7, which generates S22 a pair of keys (public and private) exclusively for the user. The user public key (UPK) is then transmitted S24 to the user, in a total or partial manner, via SMS. The UME 1 intercepts the SMS message containing the UPK, so that the message will not appear to the user. This procedure guarantees that the system will identify the user and transmit in safety the UPK by using the security of the 3G system through algorithms used for validating the Ki key contained on the SIMCARD.

After reception of the public key from the user (UPK), the UME 1 sends S25 the IMSI/UPK pair to the authentication server 6 over the Internet. At this moment, validation of the user takes place on the authentication server 6, and this validation is stored S26 in the database 7. Then, also over the Internet, the UME 1 consults S27 with the server 6 on the activation state. If the IMSI/UPK pair is valid, the authentication server 6 confirms S28 the user activation. As can be seen, until this point it is not necessary to access the deviation network, since the all communications take place through the 3G network (via SMS or over the Internet). The UPK key is further used for periodical revalidation of the user for authentication on the deviation network.

Figure 3:
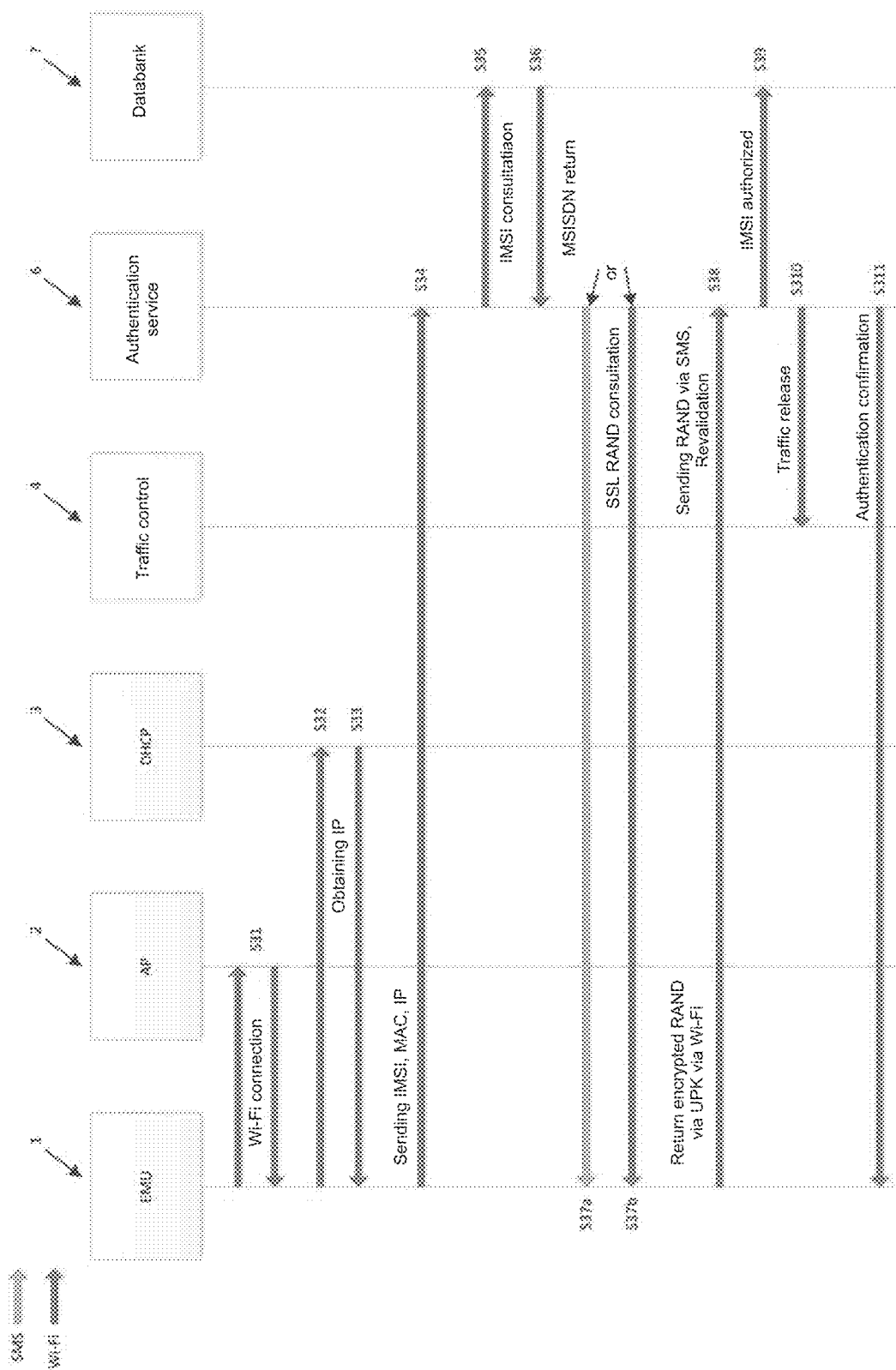
FIG. 3 shows a flow of messages between the components involved in the user authentication process in the system.
Figure 4:
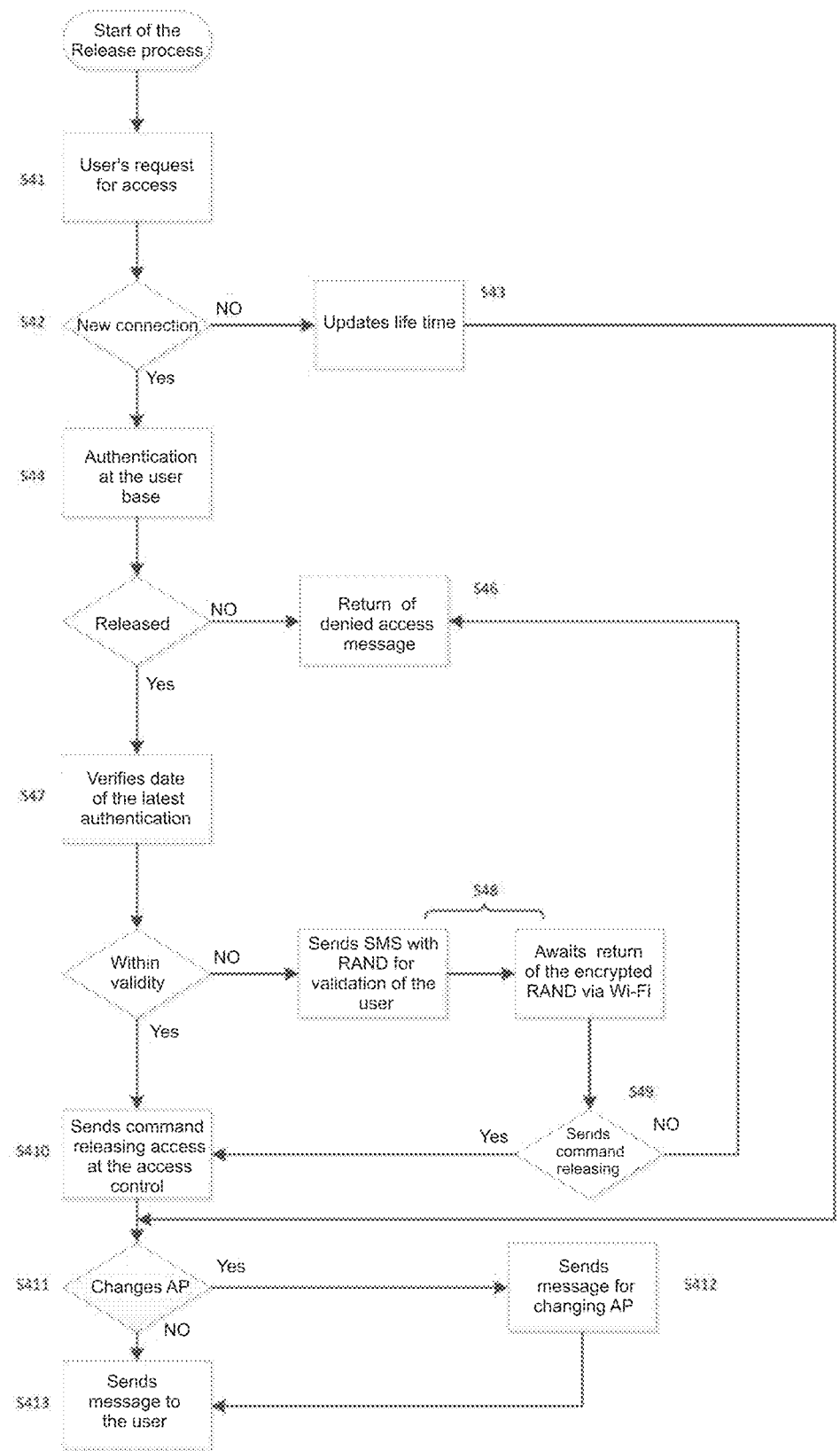
FIG. 4 is a flowchart of the user authentication process on the Wi-Fi deviation network.

The process of authenticating users on the Wi-Fi deviation network is presented in FIGS. 3 and 4. FIG. 3 presents the various communications between the entities that participate in this authentication process. FIG. 4 shows the flowchart of the process.

Once the user mobile equipment (UME) 1 has passed through the activation process in the system, it remains under constant verification of the existence of Wi-Fi access points 2, identifying the respective SSID'S (Service Set Identification). When an SSID belonging to the deviation network is identified, the UME 1 analyzes the signal level received. If the signal level referring to the deviation network is higher than the minimum value predetermined for guaranteeing connection quality, the user mobile equipment 1 connects S31 to the access point 2, establishing the first phase of connection to the system. Then, the UME 1 requests S32, S41 access to the deviation network to the DHCP server and receives from it S33 a PI number to start the user authentication process. It should be noted that the decision on the connection to the Wi-Fi access point 2 is carried out in a transparent manner to the user, independently of the operator. Therefore, in the proposed deviation system, there is no transmission of information from the Wi-Fi access point 2 through the cellular network. All the information for access of the user to the Wi-Fi network is transmitted automatically, without the need for access to the 3G network. This procedure is of great value, since it guarantees velocity and efficiency in the access to the Wi-Fi network, even without 3G network covering, unlike the traffic deviation systems found in the prior art.

Once the authentication process has been initiated, the UME 1 sends S34 to the authentication server 6 a TCP (Transmission Control Protocol) packet containing the following information: IMSI number, MAC address and IP number. The authentication server 6, on the basis of this information, verifies S42 the recent access of the user. For this purpose, the previously authenticated user database 7 arrives. If the user is not in the database 7, this is a new connection, and the system keeps this user active in its database 7 of users connected only during a period of time called user's useful time (ULT). If the user is already previously authenticated and, therefore, present in the database 7 of connected users, the authentication server 6 identifies the user and updates S43 his TVU. The flowchart in FIG. 4 illustrates these steps. It is pointed out that, during the TVU, the user may change the Wi-Fi access point 2, while still maintaining the same IP number, which enables a handoff between the WLAN cells.

After the recent access verification step, the authentication server 6 carries out the authentication step S44 in its own database 7. For this purpose, it makes a previous verification of IMSI number formatting, of the IP number and of the MAC address. If the formatting if valid, the authentication server 6 first identifies the operator of the user by identifying the MCC (Mobile Country Code) operation and the MNC (Mobile Network Code) contained in the IMSI number. In possession of this information, together with the MSISDN transmitted by the UME 1 at the moment of activating the user in the system and with the keys (public and private) for validation of the user, the system feeds its own database 7 for user authentication. This database 7 of the proposed system dispenses with the need to access the HLR (Home Location Register) and VLR (Visitor Location Register) databases of the operators and is a different procedure with respect to the solutions of deviation networks of the prior art. The database 7 of system may be used for direct sale of services to the user. In other words, the user may have a voice and/or data subscription with one telephony operator and, at the same time, acquire a Wi-Fi data plan with another operator, using the same chip (SIMCARD) and the same cellular apparatus.

As can be seen, the proposed system dispenses with any integration with the 3G network, operating in a totally independent manner Besides, the system enables users of different operators to use the same access point, sharing the infrastructure of the Wi-Fi network and without the need to duplicate it. The system further enables the user of operator A to acquire a Wi-Fi data plan from operator B using authentication by the IMSI of operator A, thus dispensing with the need to replace the SIMCARD. Besides, with the information contained in the database 7, it is possible to provide the roaming service to other operators.

Then, one makes consultation S35 on the existence of identification of the user, identified by his IMSI number, in the database 7 of users related to the operator defined by the MNC. The result of the consultation depends on commercial factors for utilization of the system by users or the operator in question. The database 7 returns S36 the MSISDN telephone number to the authentication server 6, validating or not the authentication in the system. If the verification is negative, the authentication server 6 ends denied-access message directly to the mobile equipment of the user 1, where the message is displayed. There is the possibility of displaying, on the UME 1, a message offering the purchase of data plan of the operator. If the verification is positive, according to the release rules established by the operator (such as, for example, if the user has data plan, if he is active in the user database 7 and also which his aces velocity is), the system initiates the user confirmation step to prevent any type of tampering with.

After verifying the recent access and validation of the user in the database 7 of its own, the system may periodically effect other verifications to prevent the user from forging requests for access to the system pretending to be another user. For this purpose, the system uses the telephony network to sent SMS messages in order to confirm the user, as described hereinafter. Once the validation has been carried out in the database 7, the authentication server 6 verifies S47 the validity of the last authentication in the database 7. If the user is not in the database 7, or if his registration is out of the validity term, the authentication server 6 sends S37a, S48 an SMS (via 3G) to the number of the mobile equipment of the user 1 containing a random access code RAND. It is also possible that the RAND code should be sent S37b through the Wi-Fi network to the locations where there is no 3G coverage. Then, the UME 1 intercepts this SMS message, so that the message will not appear to the user. After this, the RAND number, encrypted on the UME 1 through the UPK created at the moment of evaluating the user in the system, and the ISMI will be sent S38 via Wi-Fi to the authentication server 6. The confirmation of this encrypted code back by the Wi-F network represents a strong security system against any type of tampering with, since it is not possible for a false user to receive the RAND code information via SMS. Then, the server 6 encrypts the RAND number and compares it S49 with the number previously sent by SMS. If the numbers are identical, the authentication server 6 updates its validity term. After these steps, the authentication server 6 sends S310, S410 a message releasing access to the traffic control server 4. While the UME 1 is connected, it periodically transmits the ISMI, IP, MAC, SSID information to the authentication server 6, to which it is connected, as well as the list of the SSID detected by the UME 1 with the levels of the respective signals. On the bases of the information of the SSID'S, the authentication server 6 has the information on how many users are connected to each Wi-Fi access point 2. Then, verification S410 of the necessity of the UME 1 to change from one PA/AP to another AP 2 is carried out. With a view to prevent congestion by excess of users at a determined AP 2, the authentication server 6 may sent S412 a command to the UME 1 to change to another AP 2 that is close and with a satisfactory signal. After these steps to determine whether or not a handoff of the UME 1 takes place, the authentication server 6 sends S311, S413 a confirmation or authentication update message to the UME 1. If the user is still within the validity term of authenticity of the pre-established user, the server 6 will only send S37a, S48 a new SMS for verification of authenticity of the user described above if such a validity term is close to expiration. Then, the step of releasing access to the Internet for the mobile equipment of the user 1 in the traffic control server 4 is initiated. It is important to point out that this process of verifying authenticity of the user is cyclic.

The user's live time (TVU) for a recent connection should not be confused with the user's authentication validity. The TVU verifies whether the user has just connected and still has his IP number in the DHCP server, while the authenticity validity term (which may be, for example, of 1 month) verifies the veracity of the data and the authenticity of the user.

The traffic control server 4 of the system has the purpose of releasing access, controlling traffic, controlling anti-congestion, blocking UDP/TCP ports, controlling the number of simultaneous accesses and implementing firewall. Associated to each IP/MAC pair related to the user through the IMSI number, the system uses an HTB (hierarchical Token Bucket) filter to limit the maximum rate to be releases to the user, a STQ (Stochastic Fairness Queuing) process to prevent congestions in the network and an ARPTABLES scheme to control and release users by their respective MAC and IP addresses. The access velocity limits are established in accordance with the policy of the access plans contracted by each user. However, the system is dynamic, and the traffic control rules are updated with every registration of the UME 1 on the Wi-Fi network. The traffic control server 4 further provides at least one firewall with rules that prevent saturation of the network by applications that require extensive traffic utilization and control of the number of access simultaneously. Thus, the users are provided with security and stability in accessing the external network Internet.

In the user release process, after validation of the user, the authentication server 6 first emits access release commands to the traffic control server 4 (directed according to the MAC address/IP number of the user), releasing the user for navigating on the Internet through the corresponding access point 2, under a determined band limit. Finally, the authentication server 6 sends S311, S413, through the Wi-Fi network, a message to the UME 1 with access release confirmation. This message is displayed to the user on the screen of the UME 1.

Figure 5:
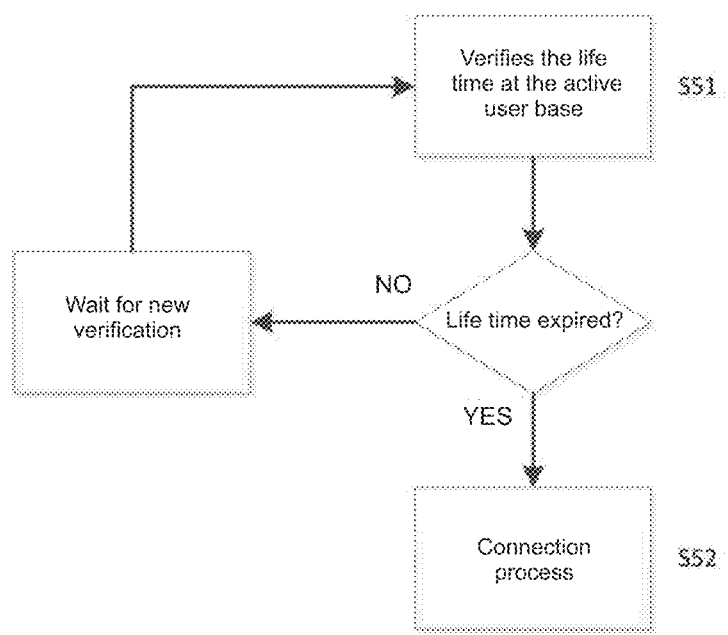
FIG. 5 is a flowchart of the process of verifying the user's life time (TVU) on the deviation network.

FIG. 5 shows the flowchart of the user's life time verification process on the deviation network. While the mobile equipment of the user 1 is connected, it transmits periodically to the authentication server 6, to which it is connected, the ISMI, IP, MAC, SSID information and the list of the SSID present with their respective signals. After verification and decision on the handoff of the EMU1 to another AP 2, the authentication server 6 then updates the user's life time (ULT) in the system. On this basis, the authentication server 6 carries out periodically an independent routine S51, with interval defined for termination of the permission for access for each connection associated to the ISMI number that exceed the ULT. All the registrations that have ULT exceeded in the database 7 of active users start the blocking process S52, in which the authentication server 6 sends a message to the traffic control server 4 to deactivate the release rule referring to the MAC address/IP number associated to each ISM number and its respective allocated band.

With every authentication of user in the system, a registration is created in the event recording database 8 containing the following data: IMSI, IP, MAC address of the mobile equipment of the user 1, maximum transmission rate released, date and time of release, besides the number of input and output Bytes carried (obtained in the HTB filter of the traffic control server 4).

At the end of the use of the system by the user, when a blockage of the IP released to the mobile equipment of the user 1 occurs, the systems transmits the data recorded in the database 8 to the operator of the user. In possession of this information, the operator can calculate the volume of data passed by the user in his system and, as a result, make the respective shielding.

Figure 6:
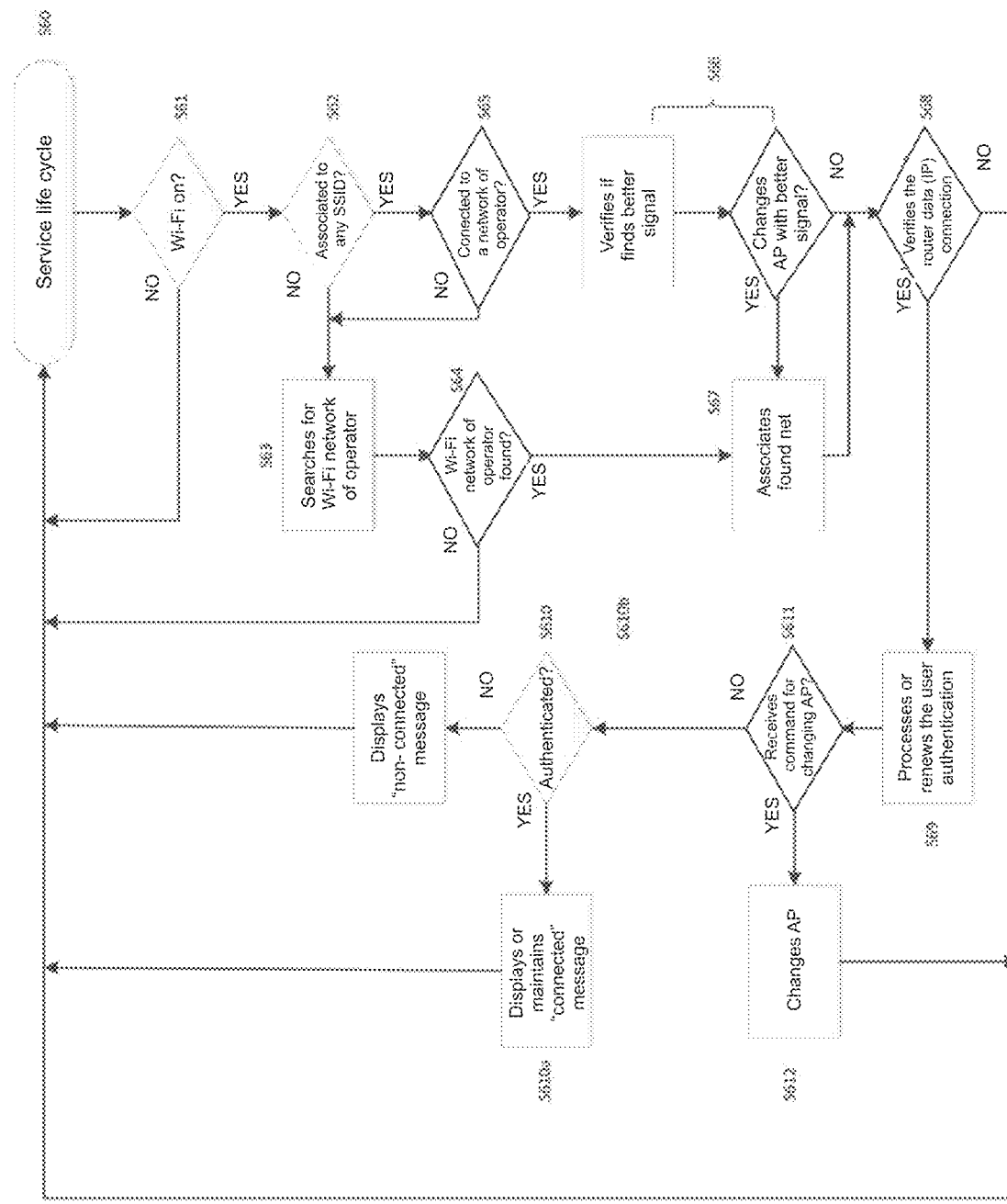
FIG. 6 is a flowchart of the user access control on the Wi-Fi deviation network.

FIG. 6 presents a flowchart of the process for controlling access of user to the Wi-Fi deviation network. As described before, after the control program has been installed in the UME 1, the processing of activating the user in the deviation system is started. Then, the UME 1 goes on to carry out a number of tasks that are essential to the functioning of this system.

From an initial state S60, the UME 1 verifies S61 whether its Wi-Fi receptor is on. If it is off, the service returns to the initial state S60 and awaits a new verification. Otherwise, the UME 1 verifies S62 whether there is any Wi-Fi network already connected to the equipment. This step S62 is of extreme importance, so that the UME 1 will not disconnect from the Wi-Fi network already connected before by the user. It is important to highlight that the UME 1 may be configured with respect to the priority of connection between a particular network known to the user and the deviation network of the operator. If there is no Wi-Fi network connected to the equipment, a scanning step S63 in search for some Wi-Fi network is initiated with the SSID pre-defined in the system (deviation network of the operator). If no Wi-Fi network of the operation is found, the service returns to the initial state S60 and awaits a new verification S61. If the deviation network is found, one makes the association S67 of this network with the UME 1 replacing any other network associated before. If in step S62, one detects that the UME 1 is connected to a Wi-Fi network, then is it verified S65 (through its SSID) if this network is the one of the operator. If not, the step S63 defined previously for searching for a Wi-Fi network begins. If the network to which the UME 1 is connected is the deviation network of the operator, the UME 1 initiates another scanning S66 on the Wi-Fi network in search of a network with the SSID of the deviation network and, upon finding such a network, it compares its signal level with the signal level of the presently associated network. When the signal level of the network found is higher than that of the present network, then one opts for chanting the networks and the association S67 of the new network to the UME 1 takes place. After the association S67, or if the verification step S66 does not find any network with a better signal than the present network, the UME 1 carries out the verification step of the existence of data connection, that is, one verifies the existence of a TCP-IP network by the Wi-Fi interface and whether there is traffic of data in this interface. If not, the service returns to the initial state S60 and awaits a new verification S61. If such a network exists, during the period of connection of the user in the Wi-Fi deviation network, the UME 1 S69 sends periodically the IMSI, IP, PAC, SSID of which it is connected, as well as the list of the SSID's detected by the UME 1 with its respective signal levels. The authentication server, on the basis of this information, may send 611 a command for change of Wi-Fi access point 2 (handoff) to the UME 1, is necessary. In the event of handoff, another life cycle of the service S60 begins. If there is no change of AP 2, the UME 1 verifies S610 whether there has been authentication to the deviation network. If so, a "connected" or "non-connected" message is displayed S610a, S610b on the screen of the UME 1, and the service returns to the initial step S60.

A preferred example of embodiment having been described, one should understand that the scope of the present invention embraces other possible variations, being limited only by the contents of the accompanying claims, which include the respective equivalents.

The invention claimed is:
1. A method for activating a user on a 3G-traffic Wi-Fi deviation network, said method comprising the steps of:
   installing a control program on user equipment (1) (UME);

sending (S21), through SMS message, from the UME (1) to an authentication server (6), IMSI and MSISDN numbers;

capturing, via the authentication server (6), the MSISDN number;

associating, via the authentication server (6), the MSISDN number to the IMSI number;

storing (S22) the IMSI and MSISDN numbers in a user database (7);

generating (S23) in the user's database (7) a pair of public (UPK) and private keys, exclusively for the UME (1);

sending (S24), through SMS message, from the authentication server (6) to the UME (1), a user public key (UPK);

intercepting, via the UME (1), the SMS message containing the user public key (UPK);

sending (S25), from the UME (1) to the authentication server (6), a IMSI/UPK pair;

periodically validating the UME (1) in the authentication server (6) based upon both the user public key (UPK) and the private key;

storing (S26) the validation of the UME (1) in the user database (7);

consulting (S27), from the UME (1) to the authentication server (6), an activation state of the authentication server (6); and sending (S28), from the authentication server (6) to the UME (1), a reply on the activation state, wherein the steps of installing, storing (S22), sending (S25), storing (S26), consulting (S27) and sending (S28) are carried out through transmissions via a network separate from and without access to the 3G-traffic Wi-Fi deviation network.

2. The method for activating a user according to claim 1, wherein the installation step is carried out by the user downloading the program from the Internet.

3. The method for activating a user according to claim 1, wherein the installation step is carried out by an operator.

4. The method for activating a user according to claim 1, wherein the interception step takes place without the SMS message appearing to the user.

5. The method for activating a user according to claim 1, wherein the control program is compatible with an operational system of the UME (1) and is executed in second plan.

* * * * *